(12) United States Patent
Monsheimer et al.

(10) Patent No.: US 8,591,797 B2
(45) Date of Patent: Nov. 26, 2013

(54) COPOLYAMIDE POWDER AND ITS PREPARATION, USE OF COPOLYAMIDE POWDER IN A SHAPING PROCESS AND MOULDINGS PRODUCED FROM THIS COPOLYAMIDE POWDER

(75) Inventors: Sylvia Monsheimer, Haltern am See (DE); Maik Grebe, Bochum (DE); Stefan Altkemper, Dorsten (DE); Sigrid Hessel-Geldmann, Haltern am See (DE); Franz-Erich Baumann, Duelmen (DE); Kristiane Warnke, Recklinghausen (DE); Heike Stemmer, Haltern am See (DE); Joachim Muegge, Haltern am See (DE); Michael Tuerke, Marl (DE); Ulrich Simon, Herne (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/407,065

(22) Filed: Mar. 19, 2009

(65) Prior Publication Data
US 2009/0236775 A1    Sep. 24, 2009

(30) Foreign Application Priority Data
Mar. 19, 2008  (DE) .......................... 10 2008 000 755

(51) Int. Cl.
B29C 35/08 (2006.01)
(52) U.S. Cl.
USPC .......................................... 264/497; 264/405
(58) Field of Classification Search
USPC .................................................. 264/497, 405
See application file for complete search history.

(56) References Cited

U.S. PATENT DOCUMENTS

| | | | |
|---|---|---|---|
| 4,386,197 A | 5/1983 | Panoch et al. | |
| 4,687,837 A * | 8/1987 | Mumcu ......................... | 528/496 |
| 5,425,817 A | 6/1995 | Mugge et al. | |
| 5,648,450 A | 7/1997 | Dickens, Jr. et al. | |
| 5,932,687 A * | 8/1999 | Baumann et al. ............. | 528/313 |
| 5,934,332 A | 8/1999 | Rodriguez et al. | |
| 6,136,948 A | 10/2000 | Dickens, Jr. et al. | |
| 6,149,836 A | 11/2000 | Mumcu et al. | |
| 6,245,281 B1 * | 6/2001 | Scholten et al. .............. | 264/497 |
| 6,884,485 B2 | 4/2005 | Baumann et al. | |
| 7,135,525 B2 | 11/2006 | Petter et al. | |
| 7,148,286 B2 | 12/2006 | Baumann et al. | |
| 7,317,044 B2 | 1/2008 | Monsheimer et al. | |
| 7,491,792 B2 | 2/2009 | Monsheimer et al. | |
| 8,119,715 B2 | 2/2012 | Monsheimer et al. | |
| 2004/0106691 A1 | 6/2004 | Monsheimer et al. | |
| 2004/0137228 A1 | 7/2004 | Monsheimer et al. | |
| 2004/0232583 A1 | 11/2004 | Monsheimer et al. | |
| 2005/0014842 A1 | 1/2005 | Baumann et al. | |
| 2005/0027050 A1 | 2/2005 | Monsheimer et al. | |
| 2006/0071359 A1 * | 4/2006 | Monsheimer et al. ......... | 264/113 |
| 2006/0134419 A1 | 6/2006 | Monsheimer et al. | |
| 2006/0182916 A1 | 8/2006 | Dowe et al. | |
| 2006/0183869 A1 | 8/2006 | Dowe et al. | |
| 2006/0202395 A1 | 9/2006 | Monsheimer et al. | |
| 2006/0223928 A1 | 10/2006 | Monsheimer et al. | |
| 2006/0244169 A1 | 11/2006 | Monsheimer et al. | |
| 2006/0246287 A1 * | 11/2006 | Gersch et al. ................. | 428/402 |
| 2006/0281873 A1 * | 12/2006 | Alting et al. .................. | 525/432 |
| 2007/0055044 A1 | 3/2007 | Simon et al. | |
| 2007/0126159 A1 | 6/2007 | Simon et al. | |
| 2007/0182070 A1 | 8/2007 | Monsheimer et al. | |
| 2007/0183918 A1 | 8/2007 | Monsheimer et al. | |
| 2007/0197692 A1 | 8/2007 | Monsheimer et al. | |
| 2007/0238056 A1 | 10/2007 | Baumann et al. | |
| 2007/0260014 A1 | 11/2007 | Simon et al. | |
| 2008/0116616 A1 | 5/2008 | Monsheimer et al. | |
| 2008/0119632 A1 | 5/2008 | Baumann et al. | |
| 2008/0166496 A1 | 7/2008 | Monsheimer et al. | |
| 2008/0242782 A1 | 10/2008 | Hager et al. | |
| 2008/0258346 A1 | 10/2008 | Simon et al. | |
| 2008/0300353 A1 | 12/2008 | Monsheimer et al. | |
| 2011/0130515 A1 | 6/2011 | Monsheimer et al. | |
| 2012/0041132 A1 | 2/2012 | Monsheimer et al. | |

FOREIGN PATENT DOCUMENTS

| | | |
|---|---|---|
| DE | 10 2004 010 160 A1 | 9/2005 |
| DE | 10 2004 012 682 A1 | 10/2005 |
| DE | 10 2004 020 453 A1 | 11/2005 |
| DE | 10 2004 020 452 A1 | 12/2005 |

(Continued)

OTHER PUBLICATIONS

U.S. Appl. No. 60/831,222, filed Jul. 17, 2006, Hager, et al.

(Continued)

*Primary Examiner* — Galen Hauth
(74) *Attorney, Agent, or Firm* — Oblon, Spivak, McClelland, Maier & Neustadt, L.L.P.

(57) ABSTRACT

A task often encountered in very recent times is the rapid provision of prototypes. Particularly suitable processes are those based on pulverulent materials and in which the desired structures are produced layer-by-layer through selective melting and solidification. The invention provides the constitution, production and use of a copolyamide powder which was produced using the following monomer units: a) laurolactam or ω-aminoundecanoic acid, and also b) dodecanedioic acid, and either c) decanediamine or dodecanediamine, in shaping processes, and also to moldings produced through a layer-by-layer process which selectively melts regions of a powder layer, using this specific powder. Once the regions previously melted layer-by-layer have been cooled and solidified, the molding can be removed from the powder bed. The moldless layer-by-layer processes for the production of components using the copolyamide powder result in simplified and more reliable conduct of the process and better recyclability.

23 Claims, No Drawings

(56) References Cited

FOREIGN PATENT DOCUMENTS

| | | |
|---|---|---|
| DE | 197 47 309 B4 | 11/2007 |
| EP | 1 015 214 A1 | 7/2000 |
| WO | WO 95/10006 | 4/1995 |
| WO | WO 96/06881 | 3/1996 |
| WO | WO 01/38061 A1 | 5/2001 |

OTHER PUBLICATIONS

E. Schmachtenberg, et al., "Lasersintern von Polyamid", Kunststoffe, Carl Hanser Verlag, Bd. 87, Nr. 6, XP000656866, Jun. 1, 1997, pp. 773, 774, 776, (with English Abstract).
U.S. Appl. No. 12/989,899, filed Oct. 27, 2010, Wurshche, et al.
U.S. Appl. No. 13/581,085, filed Aug. 24, 2012, Baumann, et al.
U.S. Appl. No. 13/889,568, filed May 8, 2013, Diekmann, et al.

* cited by examiner

COPOLYAMIDE POWDER AND ITS PREPARATION, USE OF COPOLYAMIDE POWDER IN A SHAPING PROCESS AND MOULDINGS PRODUCED FROM THIS COPOLYAMIDE POWDER

FIELD OF THE INVENTION

A task often encountered in very recent times is the rapid provision of prototypes. Particularly suitable processes are those based on pulverulent materials and in which the desired structures are produced layer-by-layer through selective melting and solidification. Support structures for overhangs and undercuts can be omitted here, since the powder bed surrounding the molten regions provides sufficient support. The subsequent work needed to remove supports is likewise no longer needed. The processes are also suitable for short-run production.

DISCUSSION OF THE BACKGROUND

The present invention relates to the constitution, production and use of a copolyamide powder which was produced using the following monomer units:
laurolactam or ω-aminoundecanoic acid, and either
dodecanedioic acid or sebacic acid, and either
decanediamine or dodecanediamine,
in shaping processes, and also to mouldings produced through a layer-by-layer process which selectively melts regions of a powder layer, using this specific powder. Once the regions previously melted layer-by-layer have been cooled and solidified, the moulding can be removed from the powder bed.

The selectivity of the layer-by-layer processes here can by way of example be achieved through the application of susceptors, or of absorbers or inhibitors, or through masks, or by way of focussed energy introduction, for example through a laser beam, or by way of glass fibres. The energy is introduced by way of electromagnetic radiation.

A description is given below of some processes which can be used to produce mouldings of the invention, with use, as in the invention, of the copolyamide powder, but there is no intention that the invention be restricted thereto.

A process particularly suitable for the purposes of rapid prototyping is selective laser sintering. In this process, plastics powders in a chamber are selectively and briefly radiated with a laser beam, whereupon the powder particles impacted by the laser beam melt. The molten particles coalesce and rapidly solidify again to give a solid mass. Repeated irradiation of a succession of newly applied layers by this process is a simple and rapid way of producing three-dimensional bodies.

The laser sintering (rapid prototyping) process for producing mouldings from pulverulent polymers is described in detail in the U.S. Pat. No. 6,136,948 and WO 96/06881 (both DTM Corporation). A wide variety of polymers and copolymers is claimed for this application, examples being polyacetate, polypropylene, polyethylene, ionomers and polyamide.

Other processes of good suitability are the SIB process, as described in WO 01/38061, or a process described in EP 1 015 214. Both processes operate with full-surface infrared heating to melt the powder. The first process achieves selectivity of melting by applying an inhibitor, and the second process achieves this through a mask. DE 103 11 438 describes a further process. In this, the energy needed for fusion is introduced via a microwave generator, and the selectivity is achieved through application of a susceptor.

Other suitable processes are those using an absorber, either present within the powder or applied by ink-jet processes, as described in DE 10 2004 012 682.8, DE 10 2004 012 683.6 and DE 10 2004 020 452.7.

Materials that can be used for the rapid prototyping or rapid manufacturing processes mentioned (RP processes or RM processes) are pulverulent substrates, in particular polymers, preferably selected from polyester, polyvinyl chloride, polyacetal, polypropylene, polyethylene, polystyrene, polycarbonate, poly(N-methylmethacrylimide) (PMMI), polymethyl methacrylate (PMMA), ionomer, polyamide, or a mixture thereof.

WO 95/11006 describes a polymer powder suitable for laser sintering which on determination of melting behavior by differential scanning calorimetry at a scanning rate of from 10 to 20° C./min shows no overlap of the melting- and recrystallization peak, and exhibits a degree of crystallinity of from 10 to 90%, likewise determined by DSC, and has a number-average molecular weight Mn of from 30 000 to 500 000, and has a Mw/Mn quotient in the range from 1 to 5.

DE 197 47 309 describes the use of a nylon-12 powder with increased melting point and increased enthalpy of fusion, obtained through reprecipitation of a polyamide previously produced through ring-opening and subsequent polycondensation of laurolactam. This is a nylon-12. An advantage of this precipitated powder is a particle shape advantageous for the application of thin layers, and good separation of melt and powder in shaping processes that construct layers.

EP 03 769 351 describes a single-component polyamide powder with low BET surface area for use in laser sintering. The low BET surface area here is achieved through a downstream mechanical operation, for example in a high-speed mixer.

DE 10 2004 010 160 A1 describes the use of polymer powder with copolymer in shaping processes. This involves thermoplastic random copolymers composed of a very wide variety of monomer units. Monomers are mentioned by way of example for copolyesters, but no details of specific constitutions are given. The MFR value of the copolymers is from 1 to 10 g/10 min. The powders produced therefrom are exclusively obtained by low-temperature milling.

One problem that has to be solved when polymer powder is processed in a mouldless process is that, to avoid what is known as curl, the temperature in the construction chamber has to be maintained with maximum uniformity at a level just below the melting point of the polymeric material. In the case of amorphous polymers, this means a temperature just below the glass transition temperature, and in the case of semicrystalline polymers it means a temperature just below the crystallite melting point. Curl means distortion of the previously melted region, the result being at least some protrusion out of the construction plane. This produces a risk that when the next powder layer is applied, for example via a doctor or a roll, the protruding regions will be displaced or even pulled away completely. The overall construction chamber temperature in the process therefore has to be maintained at a relatively high level, and the volume change brought about by cooling and by crystallization of the mouldings produced by such processes is therefore considerable. Another significant point is that the period required for the cooling process is not inconsiderable, specifically for "rapid" processes.

An intrinsic feature of semicrystalline thermoplastics which is difficult to control in many instances is their crystallinity, or the resultant volume change during cooling of the melt. Although the volume change caused by crystallinity in a single layer can substantially be compensated by using a very complicated and precise temperature profile, the volume change resulting from crystallization in three-dimensional mouldings of any desired structure is non-uniform across the moulding. By way of example, formation of crystalline structures depends on the cooling rate of the moulding, and the rate at locations of varying thickness or at locations involving angles differs from the rate at other locations within the moulding. Secondly, high enthalpy of fusion is needed for good delineation between the molten regions and their environment, this being a deciding factor in relation to the dimensional accuracy of the component.

In terms of processing reliability, another disadvantage of the commercially available and most widely used homopolyamide, nylon-12 powder, is a relatively high BET surface area in comparison with ground powder or powder obtained by polymerization in solution. The high BET surface area leads to impaired powder flowability, and although this can be countered by addition of a suitable powder-flow aid, this is achieved at the cost of decreased processing latitude, and the result, less reliable processes, is rather counterproductive for rapid manufacturing. The high BET surface area also has a disadvantageous effect on the warpage of the components. Powders obtained by milling with low BET surface area, for example nylon-11, which is likewise used commercially, have sharp-edged particles, the shape of which is likewise disadvantageous for processing reliability.

A disadvantage of amorphous thermoplastics is high viscosity, permitting coalescence only markedly above the melting point or the glass transition temperature. Mouldings produced by above processes using amorphous thermoplastics are therefore often relatively porous; sinter necks are merely formed, and the individual powder particles are discernible in the moulding. However, if energy input is increased in order to reduce viscosity there is the additional problem of dimensional accuracy; by way of example, heat conducted from the regions to be melted into the surrounding regions makes the contours of the moulding indistinct.

There is therefore a need for a precisely adjustable mixture of the properties which were described in the introduction and are typical of amorphous and of semicrystalline polymers. Unfortunately, copolymers of the background art do not satisfy these requirements.

A disadvantage of the copolymers described in the literature hitherto, in particular copolyamides for use in mouldless shaping processes, is that although the composition can achieve a lowering of the melting points, with a favourable effect on processability and on shrinkage, specifically by using at least one aromatic monomer unit, the result of this is reduced crystallinity, and the crystallite melting point therefore does not then describe the transition from solid to liquid, but increasingly describes the glass transition, this transition being gradual and dependent on the compositions of the copolymers. The aromatic monomer unit can by way of example be terephthalic acid or isophthalic acid. However, these aromatic components generate a counter-effect of markedly increasing the viscosity of the melt, making coalescence of the powder particles more difficult. A compromise therefore always has to be found between competing targeted properties. Furthermore, powder composed of the usual copolymers cannot be precipitated and therefore has to be obtained by other processes, such as low-temperature milling. However, this gives sharp-edged particles which have a disadvantageous effect during processing.

It was therefore an object of the present invention to permit, in mouldless shaping processes, the use of a polymer powder which combines the contradictory properties of low BET surface area, round grain shape and low viscosity just above the crystallite melting point, while simultaneously having high enthalpy of fusion. The process here is a layer-by-layer process in which regions of the respective powder layer are selectively melted by electromagnetic energy and, after cooling, have bonded to give the desired moulding.

DETAILED DESCRIPTION OF THE INVENTION

Surprisingly, it has now been found, that when specific copolyamide powder produced using the following monomer units
  laurolactam or ω-aminoundecanoic acid, and either
  dodecanedioic acid or sebacic acid, and either
  decanediamine or dodecanediamine
is used in a layer-by-layer process by selective melting of regions of the respective powder layer, despite processing at low temperatures in the construction chamber, it is possible to use very low viscosity of the polymer, and the dimensional accuracy of the resultant mouldings is good. This gives high component densities, together with good processability and low shrinkage. Process reliability here is extremely high.

The present invention therefore provides the use of specific copolyamide powder in a mouldless shaping process which operates layer-by-layer, by selective melting of regions of the respective layer, characterized in that the powder comprises at least one copolyamide produced using the following monomer units:
  a) laurolactam or ω-aminoundecanoic acid, and either
  b) dodecanedioic acid or sebacic acid, and either
  c) decanediamine or dodecanediamine.

Within the present invention, any ranges given below include explicitly all values and subvalues between the lower and higher limit of the range.

A preferred monomer unit for the copolyamide component in the use according to the invention is from 50 to 98 parts of laurolactam or ω-aminoundecanoic acid, particularly preferably from 75 to 98 parts, and very particularly preferably from 85 to 98 parts.

It is preferable that identical parts of the diacid and diamine monomer units are used in the copolyamide component. The total proportion of these two monomer units together is from 2 to 50 parts of the copolyamide component of the powder composition.

The present invention also provides mouldings produced by a layer-by-layer process, by selective melting of regions of the respective layer through introduction of electromagnetic energy, characterized in that they comprise a copolyamide powder produced using the following monomer units:
  a) laurolactam or ω-aminoundecanoic acid, and either
  b) dodecanedioic acid or sebacic acid, and either
  c) decanediamine or dodecanediamine.

A preferred monomer unit for the copolyamide component in the use according to the invention is from 50 to 98 parts of laurolactam or ω-aminoundecanoic acid, particularly preferably from 75 to 98 parts, and very particularly preferably from 85 to 98 parts. It is preferable that identical parts of the diacid and diamine monomer units are used in the copolyamide component. The total proportion of these two monomer units together is from 2 to 50 parts of the copolyamide component of the powder composition.

The copolyamide powder is described below, as also is its use according to the invention, without any intention to restrict the invention thereto.

Surprisingly, the use of the specific copolyamide in the process according to the invention finds a gap between the competing properties described above. Copolyamides (hotmelts) are generally produced from at least one aromatic monomer unit, therefore having low flowability and not being highly crystalline. The use of a d) laurolactam or ω-aminoundecanoic acid, and either
    e) dodecanedioic acid or sebacic acid, and either
    f) decanediamine or dodecanediamine in the polycondensation reaction leads to a copolyamide with very specific properties. According to the nomenclature of ISO 1874, these are copolyamides termed PA12/1012, PA12/1212, PA11/1012, PA11/1212, PA11/1010, PA12/1010, PA11/1210, PA12/1210, as a function of the composition of the monomer units. The copolyamide obtained by polycondensation has a random structure.

A melting point below the temperature typical of nylon-12, 176° C., and, respectively, below the temperature typical of nylon-11, 186° C., as a function of starting component, together with high crystallinity of the copolyamide is an unusual combination of properties, which has a surprisingly favourable effect on the process according to the invention. An unexpected advantage is that fine-particle powder can be obtained by a precipitation process from the copolyamides described.

In the precipitation process, the specific copolyamide is dissolved under pressure in a solvent, preferably an alcohol having from one to three carbon atoms, with preference ethanol, at an elevated temperature, and is then precipitated by controlled cooling of the solution. This cooling can be uniform or can take place in stages and at various rates. The person skilled in the art can readily use experiments to determine suitable conditions. Suitable precipitation processes are described by way of example in EP 863174 and in DE 2906 647, but there is no intention that the procedure be restricted thereby.

The term "copolyamide powder" in this description is to be understood to mean that the powder comprises a specific copolyamide but can also comprise other components, such as fillers or auxiliaries or other polymers.

A feature of the specific copolyamide powder obtained by the precipitation process is that the precipitation process can be used to set a narrow, fine grain size distribution, and also a substantially ovoid or round particle shape, and a melting point (crystallization melting point) of from 170 to 184° C., preferably from 175 to 184° C., if laurolactam was used, and a melting point of from 180 to 193° C., preferably from 185 to 193° C., if ω-aminoundecanoic acid was used.

The enthalpy of fusion of the specific copolyamide powder is preferably greater than 90 J/g, particularly preferably greater than 95 J/g, and very particularly preferably greater than 100 J/g. These enthalpies of fusion are set by the precipitation process together with a round grain shape and a BET surface area of less than 8 $m^2/g$, and are moreover a unique combination of properties which can be used advantageously in the shaping processes as described.

The various parameters were determined by DSC (differential scanning calorimetry) to DIN 53765 or to AN-SAA 0663. The measurements were made using a Perkin Elmer DSC 7 with nitrogen as flushing gas and with a heating rate and cooling rate of 20 K/min. The measurement range was from −90 to +250° C.

The BET surface area of the resultant powder is typically from 1 to 8 $m^2/g$, preferably from 1 to 5 $m^2/g$, and very particularly preferably from 1 to 3 m/g. The average grain diameter is preferably from 30 to 70 μm, preferably from 32 to 60 μm, and particularly preferably from 35 to 50 μm. The bulk density is typically—without addition of any powder-flow aid—from 300 to 600 g/l.

The solution viscosity in 0.5% strength cresol solution to DIN 53727 of the polyamide powders according to the invention is preferably from 1.4 to 2.3, particularly preferably from 1.5 to 2.1, and very particularly preferably from 1.55 to 1.9. The powder can also comprise a mixture composed of components with a targeted difference in viscosity.

The copolyamide can moreover be an unregulated, partially regulated or regulated copolyamide, and the regulators known in the background art for polyamides can be used here. The powder comprising the copolyamide according to the invention can also comprise two or more differently regulated components, and also further fillers and auxiliaries.

Surprisingly, the use according to the invention of the specific powder comprising copolyamides leads to good processing properties and also to good component properties. The compromise described above between various targeted properties is avoided, and an entirely new processing range is thus attained, with surprising possibilities, which will be explained below.

The viscosity is so low that a very smooth melt film becomes established in the construction chamber, given moderate preheating to just below the melting point. The good melt flow leads to mouldings whose density is close to the density of components injection-moulded from corresponding material. The crystallinity leads to good delineation between the regions melted by selective energy input and the non-molten regions. Energy input can thus be matched to the melt flow required in such a way as to avoid any undesired "growth" of the mouldings outside of the intended profile, for example through conductive heat. The copolyamide powder gives excellent results when used in the process according to the invention, and can readily be used in an automated procedure.

The person skilled in the art can readily determine the parameters for optimized processing. The copolyamide powder can be processed with greater reliability, since, surprisingly, processing latitude is markedly greater than for the nylon-11 or -12 powders currently commercially available.

Recyclability is better than that of the powder of the background art. By virtue of the lower melting point of the precipitated copolyamide powder, in comparison with precipitated nylon-11 and, respectively, nylon-12 powder, firstly less energy is needed in the process, and secondly problems such as shrinkage and dimensional accuracy, as described above, are mitigated. The time needed for heating and cooling is reduced.

The mouldings according to the invention, produced by a process according to the invention, moreover have white intrinsic colour.

The copolyamides are produced according to the background art through polycondensation of the C11 and, respectively, C12 lactams and, respectively, ω-aminocarboxylic acids with the C10 and, respectively, C12 diamines and C10 and, respectively, C12 dicarboxylic acids mentioned, in approximately equimolar ratio. A powder not according to the invention can be obtained from these materials by the processes known in the background art, for example low-temperature milling, or else other processes. However, the specific copolyamides are precipitated to obtain powders according to the invention. The copolyamide pellets are dissolved in hot solvent, for example ethanol, and then precipitated to give pulverulent particles for use in the process according to the invention. At least one precautionary sieving should then be carried out to remove the very coarse particles. A subsequent fractionation is mostly advisable. The D50 of the copolyamide powders is preferably from 30 to 70 μm, particularly preferably from 32 to 60 μm, and very particularly preferably from 35 to 50 μm. The grain size distribution here is relatively narrow. Typical values for the D10/D90 ratio are from 1:2 to 1:10, preferably from 1:2 to 1:5.

The copolyamide powder according to the invention therefore requires none of the downstream mechanical operations, for example in a high-speed mixer, for rounding of the particles and lowering of the specific surface area for better applicability of relatively thin layers, as described in EP 03 769 351. The BET surface area of the copolyamide powder according to the invention is from 1 to 8 m$^2$/g, preferably from 1 to 5 m$^2$/g, and very particularly preferably from 1 to 3 ml/g. The advantageous low BET surface area is therefore established even without the said additional production step.

The powder which comprises the specific copolyamides and which is intended for use in the process according to the invention can, moreover, comprise auxiliaries and/or fillers and/or further organic or inorganic pigments. These auxiliaries can by way of example be powder-flow aids, e.g. precipitated and/or fumed silicas. Fumed silicas are supplied by way of example with product name Aerosil by Degussa AG, with various specifications. Polymer powder preferably comprises less than 3% by weight, preferably from 0.001 to 2% by weight and very particularly preferably from 0.05 to 1% by weight, of these auxiliaries, based on the entirety of the polymers present. The fillers can by way of example be glass particles, metal particles or ceramic particles, e.g. glass beads, steel shot or metal granules, or foreign pigments, e.g. transition metal oxides. They can also be of hollow structure. The pigments can by way of example be titanium dioxide particles based on rutile (preferably) or anatase, or can be carbon black particles. Mention may also be made here of the use of carbon fibres, which may also have been ground.

The median size of the filler particles here is preferably smaller than or approximately equal to that of the particles of the copolyamide powder. The amount by which the median particle size $d_{50}$ of the fillers exceeds the median particle size $d_{50}$ of the copolyamide should preferably be not more than 20%, preferably not more than 15% and very particularly preferably not more than 5%. A particular limitation on the particle size is the permissible overall height and, respectively, layer thickness in the rapid prototyping/rapid manufacturing system.

The amount of these fillers in the copolyamide powder is preferably less than 75% by weight, with preference from 0.001 to 70% by weight, with particular preference from 0.05 to 50% by weight and very particular preference from 0.5 to 25% by weight, based on the entirety of the copolyamides present.

If the stated upper limits for auxiliaries and/or fillers are exceeded, the result, as a function of the filler or auxiliary used, can be marked impairment of the mechanical properties of mouldings produced by means of these powders.

It is also possible to mix conventional polymer powders with the copolyamide powder according to the invention. This method can give powders with a further combination of surface properties. The process for production of these mixtures can be found by way of example in DE 34 41 708.

To improve melt flow during the production of the mouldings, a flow agent can be added to the powder, examples being metal soaps, preferably the alkali metal or alkaline earth metal salts of the underlying alkanemonocarboxylic acids or dimer acids. The metal soap particles can be incorporated into the copolymer particles, but mixtures of fine metal soap particles and copolymer particles are also possible. This procedure is described in principle in EP1424354.

The amounts used in the metal soaps are from 0.01 to 30% by weight, preferably from 0.5 to 15% by weight, based on the entirety of the copolymers present in the powder. Metal soaps preferably used are the sodium or calcium salts of the underlying alkanemonocarboxylic acids or dimer acids. Example, of commercially available products are Licomont NaV 101 or Licomont CaV 102 from Clariant.

Materials which can be added to the copolymer powder in order to improve its processability or for further modification of the copolymer powder are inorganic foreign pigments, e.g. transition metal oxides, stabilizers, e.g. phenols, in particular sterically hindered phenols, flow agents and powder-flow aids, e.g. fumed silicas, and also filler particles. The amount of these substances added to the copolymers, based on the total weight of copolymers in the copolymer powder, is preferably such that they comply with the stated concentrations for fillers and/or auxiliaries for the copolymer powder according to the invention.

The present invention provides processes for the production of mouldings through layer-by-layer processes, by selective melting of regions of the respective layer, using a powder which comprises specific copolyamides and which is characterized in that it was produced using the following monomer units:

g) laurolactam or ω-aminoundecanoic acid, and either
h) dodecanedioic acid or sebacic acid and either
i) decanediamine or dodecanediamine.

A preferred monomer unit for the copolyamide component in the use according to the invention is from 50 to 98 parts of laurolactam or ω-aminoundecanoic acid, particularly preferably from 75 to 98 parts, and very particularly preferably from 85 to 98 parts. It is preferable that identical parts of the diacid and diamine monomer units are used in the copolyamide component. The total proportion of these two monomer units together is from 2 to 50 parts of the copolyamide component of the powder composition.

The energy is introduced through electromagnetic radiation, and the selectivity is introduced by way of example through masks, or application of inhibitors, or absorbers, or of susceptors, or else through focussing of the radiation, for example through lasers. The electromagnetic radiation encompasses the range from 100 nm to 10 cm, preferably from 400 nm to 10 600 nm or from 800 to 1060 nm. The source of the radiation can by way of example be a microwave generator, a suitable laser, a radiant heater or a lamp, or else a combination thereof. The moulding according to the invention can be removed after all of the layers have cooled.

The examples below of these processes serve for illustration, but there is no intention to restrict the invention thereto.

Laser sintering processes are well known and are based on the selective sintering of polymer particles, where layers of polymer particles are briefly exposed to laser light and the polymer particles exposed to the laser light are thus bonded to one another. Sequential sintering of layers of polymer particles produces three-dimensional objects. Details of the selective laser sintering process can be found by way of example in the specifications U.S. Pat. No. 6,136,948 and WO 96/06881.

Other processes of good suitability are the SIB process, as described in WO 01/38061, or a process described in EP 1 015 214. Both processes operate with full-surface infrared heating to melt the powder. The first process achieves selectivity of melting by applying an inhibitor, and the second process achieves this through a mask. DE 103 11 438 describes a further process. In this, the energy needed for fusion is introduced via a microwave generator, and the selectivity is achieved through application of a susceptor.

Other suitable processes are those using an absorber, either present within the powder or applied by ink-jet processes, as described in DE 10 2004 012 682.8, DE 10 2004 012 683.6 and DE 10 2004 020 452.7.

A feature of the mouldings according to the invention, produced by a layer-by-layer process, by selective melting of regions, is that they comprise at least one specific copolyamide, which is characterized in that was produced using the following monomer units:

j) laurolactam or ω-aminoundecanoic acid, and either
k) dodecanedioic acid or sebacic acid, and either
l) decanediamine or dodecanediamine.

A preferred monomer unit for the copolyamide component in the use according to the invention is from 50 to 98 parts of laurolactam or ω-aminoundecanoic acid, particularly preferably from 75 to 98 parts, and very particularly preferably from 85 to 98 parts. It is preferable that identical parts of the diacid and diamine monomer units are used in the copolyamide component. The total proportion of these two monomer units together is from 2 to 50 parts of the copolyamide component of the powder composition.

The mouldings can moreover comprise fillers and/or auxiliaries (the data for the copolymer powder being applicable here), e.g. heat stabilizers, e.g. sterically hindered phenol derivatives. Fillers can by way of example be glass particles, ceramic particles, and also metal particles, for example iron shot, or corresponding hollow particles. The mouldings according to the invention preferably comprise glass particles, very particularly preferably glass beads. Mouldings according to the invention preferably comprise less than 3% by weight of these auxiliaries, based on the entirety of the copolymers present, particularly preferably from 0.001 to 2% by weight and very particularly preferably from 0.05 to 1% by weight. Mouldings according to the invention likewise preferably comprise less than 75% by weight of these fillers, based on the entirety of the copolymers present, preferably from 0.001 to 70% by weight, particularly preferably from 0.05 to 50% by weight and very particularly preferably from 0.5 to 25% by weight.

Application sectors for these mouldings can be found not only in rapid prototyping but also in rapid manufacturing. The latter certainly means small runs, i.e. the production of more than one identical part, but where production by means of an injection mould is uneconomic. Examples here are parts for high-specification cars of which only small numbers of units are produced, or replacement parts for motor sports, where it is not only the small numbers of units but also the availability time that is important. Industries which can use the parts according to the invention are the aerospace industry, medical technology, mechanical engineering, automobile construction, the sports industry, the household goods industry, and the electrical industry and lifestyle sector.

The examples below are intended to describe the copolyamide powder, and also its use according to the invention, without restricting the invention to the examples.

The values measured for laser diffraction were obtained with a Malvern Mastersizer S, Ver. 2.18. Bulk density was determined with an apparatus to DIN 53 466. BET surface area was determined through gas adsorption using the Brunauer, Emmet and Teller principle; the standard used is DIN ISO 9277.

Having generally described this invention, a further understanding can be obtained by reference to certain specific examples which are provided herein for purposes of illustration only, and are not intended to be limiting unless otherwise specified.

EXAMPLES

Production of Pellets

Example 1

Nylon-12 Pellets, Regulated 1000 g of laurolactam, 10.5 g of 1,12-dodecanedioic acid, 445 g of water and 0.1 g of 50% strength aqueous hypophosphorous acid were heated 1 to 280° C. under autogenous pressure (about 22 bar) in a stirred 2l V4A-steel autoclave, and, after 5 hours, depressurized to atmospheric pressure within a period of 3 hours. Nitrogen was passed over the melt for a further 2 hours. The reaction product was extruded, pelletized, and dried at 70° C.

| | |
|---|---|
| Relative solution viscosity: | 1.62 |
| Extract content: | 1.26% by weight |
| Melting point (DSC): | 177° C. |
| Enthalpy of fusion: | 77 J/g |
| COOH: | 119 mmol/kg |
| $NH_2$: | 6 mmol/kg |

Example 2

Nylon-12 Pellets, Unregulated

Example 1 was repeated without addition of dodecanedioic acid. The depressurization here was carried out only as far as a residual pressure of 2.7 bar, and the melt was then allowed to equilibrate under this pressure for 1 hour. The reaction product was extruded and pelletized.

| | |
|---|---|
| Relative solution viscosity: | 1.62 |
| Extract content: | 1.05% by weight |
| Melting point (DSC): | 178° C. |
| Enthalpy of fusion: | 74 J/g |
| COOH: | 72 mmol/kg |
| $NH_2$: | 65 mmol/kg |

Example 3

Nylon-12/12,12 Copolyamide Pellets, (95:5)

Example 1 was repeated with the following starting materials:

| | |
|---|---|
| Laurolactam | 851 g |
| Dodecanediamine | 22.9 g |
| Dodecanedioic acid | 26.1 g |

Properties of Product:

| | |
|---|---|
| Relative solution viscosity: | 1.77 |
| Extract content: | 1.25% by weight |
| Melting point (DSC): | 174° C. |
| Enthalpy of fusion: | 69 J/g |
| COOH: | 84 mmol/kg |
| $NH_2$: | 31 mmol/kg |

Example 4

Nylon-12/12,12 Copolyamide Pellets, (90:10)

Example 1 was repeated with the following starting materials:

| | |
|---|---|
| Laurolactam | 803 g |
| Dodecanediamine | 45.6 g |
| Dodecanedioic acid | 52.1 g |

Properties of Product:

| | |
|---|---|
| Relative solution viscosity: | 1.84 |
| Extract content: | 1.18% by weight |
| Melting point (DSC): | 172° C. |
| Enthalpy of fusion: | 65 J/g |
| COOH: | 73 mmol/kg |
| $NH_2$: | 29 mmol/kg |

Example 5

Nylon-12/12,12 Copolyamide Pellets, (80:20)

Example 1 was repeated with the following starting materials:

| | |
|---|---|
| Laurolactam | 707 g |
| Dodecanediamine | 90.4 g |
| Dodecanedioic acid | 103.2 g |

Properties of Product:

| | |
|---|---|
| Relative solution viscosity: | 1.74 |
| Extract content: | 1.43% by weight |
| Melting point (DSC): | 168° C. |
| Enthalpy of fusion: | 71 J/g |
| COOH: | 104 mmol/kg |
| $NH_2$: | 36 mmol/kg |

Example 6

Nylon-12/10,12 Pellets (90:10)

Example 1 was repeated with the following starting materials:

| | |
|---|---|
| Laurolactam | 808 g |
| Decanediamine | 39.5 g |
| Dodecanedioic acid | 52.4 G |

Properties of Product:

| | |
|---|---|
| Relative solution viscosity: | 1.58 |
| Extract content: | 1.21% by weight |
| Melting point (DSC): | 173° C. |
| Enthalpy of fusion: | 66 J/g |
| COOH: | 9 mmol/kg |
| $NH_2$: | 143 mmol/kg |

Example 7

Nylon-12/10,12 Pellets (95:5)

Example 1 was repeated with the following starting materials:

| | |
|---|---|
| Laurolactam | 854 g |
| Decanediamine | 19.8 g |
| Dodecanedioic acid | 26.2 g |

Properties of Product:

| | |
|---|---|
| Relative solution viscosity: | 1.66 |
| Extract content: | 1.19% by weight |
| Melting point (DSC): | 174° C. |
| Enthalpy of fusion: | 66 J/g |
| COOH: | 9 mmol/kg |
| $NH_2$: | 143 mmol/kg |

Production of Precipitated Powders

Example 8

Nylon-12 Homopolyamide, not According to the Invention 400 g of the pellets from Example 1 were dissolved at 152° C. in 2.6 l of 96% ethanol, denatured with 2-butanone, in a 5 l stirred vessel provided with blade stirrer, using a stirrer rotation rate of 160 rpm, and were kept at this temperature for 75 minutes. The contents of the vessel were cooled within the period of 40 minutes to 110° C., and this temperature was maintained for 60 minutes. Heat evolution was discernible through an increase of 2 K in internal temperature, and ceased after about 25 minutes. The suspension was cooled to 75° C. and transferred to a paddle dryer for drying (80° C., 3 hours).

This gave a powder with the following properties:

| | |
|---|---|
| Bulk density: | 417 g/l |
| Grain size distribution (d10/d50/d90): | 43 μm/66 μm/89 μm |
| Melting point (DSC): | 186° C. |
| Enthalpy of fusion: | 119 J/g |
| BET surface area: | 6.8 m²/g |
| LL content (GC): | 0.28% |

Example 9

Nylon-12 Homopolyamide, not According to the Invention 400 g of the pellets from Example 2 were dissolved at 152° C. in 2.6 l of 96% ethanol, denatured with 2-butanone, in a 5 l stirred vessel provided with blade stirrer, using a stirrer rotation rate of 160 rpm, and were kept at this temperature for 75 minutes. The contents of the vessel were cooled within the period of 40 minutes to 110° C., and this temperature was maintained for 60 minutes. Heat evolution was discernible through an increase of 2 K in internal temperature, and ceased after about 25 minutes. The suspension was cooled to 75° C. and transferred to a paddle dryer for drying (80° C., 3 hours).

This gave a powder with the following properties:

| | |
|---|---|
| Bulk density: | 432 g/l |
| Grain size distribution (d10/d50/d90): | 41 μm/69 μm/91 μm |
| Melting point (DSC): | 187° C. |
| Enthalpy of fusion: | 114 J/g |
| BET surface area: | 7.1 m$^2$/g |
| LL content (GC): | 0.21% |

Example 10

Nylon-12/12,12 (95:5), According to the Invention 400 g of the pellets from Example 3 were dissolved at 145° C. in 2.6 l of 96% ethanol, denatured with 2-butanone, in a 5 l stirred vessel provided with blade stirrer, using a stirrer rotation rate of 160 rpm, and were kept at this temperature for 75 minutes. The contents of the vessel were cooled within the period of 40 minutes to 107° C., and this temperature was maintained for 60 minutes. Heat evolution was discernible through an increase of 2 K in internal temperature, and ceased after about 25 minutes. The suspension was cooled to 75° C. and transferred to a paddle dryer for drying (80° C., 3 hours).

This gave a powder with the following properties:

| | |
|---|---|
| Bulk density: | 417 g/l |
| Grain size distribution (d10/d50/d90): | 49 μm/75 μm/113 μm |
| Melting point (DSC): | 181° C. |
| Enthalpy of fusion: | 113 J/g |
| BET surface area: | 3.9 m$^2$/g |
| LL content (GC): | 0.26% |

Example 11

Nylon-12/12,12 (90:10), According to the Invention 400 g of the pellets from Example 4 were dissolved at 145° C. in 2.6 l of 96% ethanol, denatured with 2-butanone, in a 5 l stirred vessel provided with blade stirrer, using a stirrer rotation rate of 160 rpm, and were kept at this temperature for 75 minutes. The contents of the vessel were cooled within the period of 40 minutes, to 103° C., and this temperature was maintained for 60 minutes. Heat evolution was discernible through an increase of 2 K in internal temperature, and ceased after about 25 minutes. The suspension was cooled to 75° C. and transferred to a paddle dryer for drying (80° C., 3 hours).

This gave a powder with the following properties:

| | |
|---|---|
| Bulk density: | 426 g/l |
| Grain size distribution (d10/d50/d90): | 41 μm/63 μm/86 μm |
| Melting point (DSC): | 178° C. |
| Enthalpy of fusion: | 104 J/g |
| BET surface area: | 3.4 m$^2$/g |
| LL content (GC): | 0.23% |

Example 12

Nylon-12/12,12 (80:20), According to the Invention 400 g of the pellets from Example 5 were dissolved at 145° C. in 2.6 l of 96% ethanol, denatured with 2-butanone, in a 5 l stirred vessel provided with blade stirrer, using a stirrer rotation rate of 160 rpm, and were kept at this temperature for 75 minutes. The contents of the vessel were cooled within the period of 40 minutes to 95° C., and this temperature was maintained for 60 minutes. Heat evolution was discernible through an increase of 2 K in internal temperature, and ceased after about 25 minutes. The suspension was cooled to 75° C. and transferred to a paddle dryer for drying (80° C., 3 hours).

This gave a powder with the following properties:

| | |
|---|---|
| Bulk density: | 426 g/l |
| Grain size distribution (d10/d50/d90): | 52 μm/100 μm/136 μm |
| Melting point (DSC): | 169° C. |
| Enthalpy of fusion: | 100 J/g |
| BET surface area: | 1.6 m$^2$/g |
| LL content (GC): | 0.21% |

Example 13

Nylon-12/10,12 (90:10), According to the Invention 400 g of the pellets from Example 6 were dissolved at 145° C. in 2.6 l of 96% ethanol, denatured with 2-butanone, in a 5 l stirred vessel provided with blade stirrer, using a stirrer rotation rate of 160 rpm, and were kept at this temperature for 75 minutes. The contents of the vessel were cooled within the period of 40 minutes; to 97° C., and this temperature was maintained for 60 minutes. Heat evolution was discernible through an increase of 2 K in internal temperature, and ceased after about 25 minutes. The suspension was cooled to 75° C. and transferred to a paddle dryer for drying (80° C., 3 hours).

This gave a powder with the following properties:

| | |
|---|---|
| Bulk density: | 440 g/l |
| Grain size distribution (d10/d50/d90): | 33 μm/52 μm/77 μm |
| Melting point (DSC): | 178° C. |
| Enthalpy of fusion: | 108 J/g |
| BET surface area: | 2.4 m$^2$/g |
| LL content (GC): | 0.24% |

Example 14

Nylon-12/10,12 (95:5), According to the Invention 400 g of the pellets from Example 7 were dissolved at 145° C. in 2.6 l of 96% ethanol, denatured with 2-butanone, in a 5 l stirred vessel provided with blade stirrer, using a stirrer rotation rate of 160 rpm, and were kept at this temperature for 75 minutes. The contents of the vessel were cooled within the period of 40 minutes to 99° C., and this temperature was maintained for 60 minutes. Heat evolution was discernible through an increase of 2 K in internal temperature, and ceased after about 25 minutes. The suspension was cooled to 75° C. and transferred to a paddle dryer for drying (80° C., 3 hours).

This gave a powder with the following properties:

| | |
|---|---|
| Bulk density: | 445 g/l |
| Grain size distribution (d10/d50/d90): | 34 μm/59 μm/94 μm |
| Melting point (DSC): | 182° C. |
| Enthalpy of fusion: | 118 J/g |
| BET surface area: | 3.2 m$^2$/g |
| LL content (GC): | 0.26% |

The powders according to the invention differ from the comparative examples in the following features described: composition, enthalpy of fusion, and BET surface area.

Further Processing and Test

The powders from the examples were used in a laser sintering machine to construct multipurpose specimens to ISO 3167. Mechanical properties were determined on the latter components by means of a tensile test to EN ISO 527 (Table 1). In each case, an EOSINT P380 laser sintering machine from EOS GmbH was used for the production process. Layer thickness was 0.15 mm. Density was determined by a simplified internal method. For this, the tensile specimens produced to ISO 3167 (multipurpose test specimen) were measured and volume was calculated from the these measurements, the weight of the tensile specimens was determined, and density was calculated from volume and weight. Shrinkage was determined through the difference between setpoint dimensions and actual dimensions of the moulding. The range of processing temperature was determined by using the following construction chamber temperatures: for the minimum construction temperature, a temperature which just prevents discernible warpage of the previously melted regions, and for the maximum processing temperature, the temperature which just prevents skinning on the powder surface. By way of example, these studies were carried out in an EOSINT P380 laser sintering machine from EOS GmbH. The powders were processed on the laser sintering machine both without powder-flow aid and also with the addition of 0.1% Aerosil 200.

TABLE 1

Results of mechanical tests on mouldings according to the examples

| Example | Processing temperature [° C.] | Modulus of elasticity [N/mm$^2$] | Elongation at break g [%] | Density [g/l] | Shrinkage [%] |
|---|---|---|---|---|---|
| Example 8 (not according to the invention) | 180-184 | 1700 | 17 | 0.95 | 3 |
| Example 14 | 170-180 | 1750 | 14 | 0.95 | 2.8 |
| Example 13 | 172-181 | 1600 | 18 | 0.95 | 2.8 |

The processing latitude of the material according to the invention was markedly greater than for Example 1, which was not in accordance with the invention. Greater processing latitude increases the reliability of the process. Greater processing latitude in conjunction with somewhat lower shrinkage moreover provided an advantage in relation to lower tendency towards warpage in comparison with the comparative material which was not in accordance with the invention. The mechanical properties of the components had very good suitability for use in rapid prototyping. The parts had a good white intrinsic colour.

German patent application 10 2008 000755.2 filed Mar. 19, 2008, and all patents and references mentioned herein are incorporated here in by reference.

Numerous modifications and variations on the present invention are possible in light of the above teachings. It is therefore to be understood that within the scope of the appended claims, the invention may be practiced otherwise than as specifically described herein.

The invention claimed is:

1. A layer-by-layer process for production of three-dimensional components, comprising:
    selective melting of regions of a powder layer of a copolyamide powder through introduction of electromagnetic energy wherein said melting occurs during said introduction of electromagnetic energy,
    wherein said powder comprises monomers of:
        75 to 98 parts of (a) a laurolactam or an ω-aminoundecanoic acid, and
        25 to 2 parts of a copolyamide component consisting of a diacid (b) and a diamine (c), wherein said diacid (b) is a dodecanedioic acid or sebacic acid, and said diamine (c) is a decanediamine or a dodecanediamine, and
    wherein said powder has a BET surface area of 5 m$^2$/g or less.

2. The process according to claim 1, wherein the powder comprises from 85 to 98 parts of (a).

3. The process according to claim 1, wherein said copolyamide comprises said diacid and said diamine in equimolar proportions.

4. The process according to claim 1, wherein said powder has a BET surface area of 3 m$^2$/g or less.

5. The process according to claim 1, wherein an enthalpy of fusion of the powder is more than 90 J/g.

6. The process according to claim 1, wherein an enthalpy of fusion of the powder is more than 95 J/g.

7. The process according to claim 1, wherein an enthalpy of fusion of the powder is more than 100 J/g.

8. The process according to claim 1, wherein a median grain diameter of the powder D50 is from 30 to 70 μm.

9. The process according to claim 1, wherein a median grain diameter of the powder D50 is from 32 to 60 μm.

10. The process according to claim 1, wherein a median grain diameter of the powder D50 is from 35 to 50 μm.

11. The process according to claim 1, wherein a solution viscosity of the copolyamide is from 1.4 to 2.3.

12. The process according to claim 1, wherein a solution viscosity of the copolyamide is from 1.5 to 2.1.

13. The process according to claim 1, wherein a solution viscosity of the copolyamide is from 1.55 to 1.9.

14. The process according to claim 1, wherein a bulk density of the powder is from 300 to 600 g/l.

15. The process according to claim 1, wherein using laurolactam, a melting point of the copolyamide powder is from 170 to 184° C.

16. The process according to claim 1, wherein using laurolactam, a melting point of the copolyamide powder is from 175 to 184° C.

17. The process according to claim 1, wherein using ω-aminoundecanoic acid, a melting point of the copolyamide powder is from 180 to 193° C.

18. The process according to claim 1, wherein using ω-aminoundecanoic acid, a melting point of the copolyamide powder is from 185 to 193° C.

19. The process according to claim 1, wherein, using laurolactam, a melting point of the copolyamide powder is from 170 to 184° C., and simultaneously a BET surface area is 3 m$^2$/g or less and an enthalpy of fusion is more than 88 J/g.

20. The process according to claim 1, wherein, using ω-aminoundecanoic acid, a melting point of the copolyamide powder is from 180 to 193° C., and simultaneously a BET surface area is 3 m$^2$/g or less and an enthalpy of fusion is more than 88 J/g.

21. The process according to claim 1, wherein the copolyamide is dissolved in a suitable solvent with exposure to heat and is then precipitated.

22. The process according to claim 1, wherein said powder has a BET surface area of the powder ranges from 1 to 5 m$^2$/g.

23. The process according to claim 1, wherein said powder has a BET surface area of the powder ranges from 1 to 3 m$^2$/g.

* * * * *